United States Patent [19]

Nylund

[11] Patent Number: 4,795,608
[45] Date of Patent: Jan. 3, 1989

[54] NUCLEAR FUEL ASSEMBLY
[75] Inventor: Olov Nylund, Västerås, Sweden
[73] Assignee: AB Asea-Atom, Västerås, Sweden
[21] Appl. No.: 42,727
[22] Filed: Apr. 27, 1987
[30] Foreign Application Priority Data
Apr. 29, 1986 [SE] Sweden .............................. 8601982
[51] Int. Cl.[4] .............................................. G21C 3/32
[52] U.S. Cl. .................................... 376/444; 376/448; 376/377
[58] Field of Search ............... 376/444, 448, 446, 443, 376/437, 377

[56] References Cited

U.S. PATENT DOCUMENTS

| | | | |
|---|---|---|---|
| 3,808,098 | 4/1974 | Fredin | 376/444 |
| 4,478,786 | 10/1986 | Andersson et al. | 376/444 |
| 4,578,241 | 3/1986 | Borrman et al. | 376/446 |
| 4,587,093 | 3/1986 | Borrman et al. | 376/444 |
| 4,588,550 | 5/1986 | Blomstrand | 376/438 |
| 4,675,154 | 6/1987 | Nelson | 376/444 |

Primary Examiner—Donald P. Walsh
Attorney, Agent, or Firm—Watson, Cole, Grindle & Watson

[57] ABSTRACT

A nuclear fuel assembly for a boiling reactor comprises a plurality of fuel rods arranged in four sub-bundles surrounded by a fuel channel of substantially square cross-section. A vertical channel-formed support member for the passage of water, separates the sub-bundles of fuel rods. By arranging each sub-bundle with a reduced corner portion by not locating a fuel rod in that corner of the sub-bundle towards the center of the fuel assembly, the sub-bundles can be located in a separating channel-formed support member with an enlarged central channel. The enlarged central channel makes it possible to contain a larger quantity of non-boiling water in the central part of the fuel assembly, which results in better neutron moderation in the central part of the fuel assembly.

10 Claims, 5 Drawing Sheets

NUCLEAR FUEL ASSEMBLY

TECHNICAL FIELD

The present invention relates to a nuclear fuel assembly for a nuclear reactor of the boiling reactor type, comprising a fuel channel, a plurality of vertical fuel rods arranged in sub-bundles and separated by a supporting device surrounded by and fixed to the fuel channel. Each fuel rod consists of a stack of pellets of nuclear fuel enclosed within a cladding tube.

BACKGROUND ART

A nuclear fuel assembly for a boiling reactor comprises several vertical fuel rods arranged in sub-bundles. Individual vertical water-filled rods may be contained within each sub-bundle of the nuclear fuel assembly. The sub-bundles of fuel rods in the fuel assembly are separated from each other by a channel-formed supporting device of substantially cruciform cross-section.

From, for example, U.S. Pat. Nos. 4,478,786, 4,578,241 and 4,587,093, it is known to separate the sub-bundles with a channel-formed support member having a generally square cross-section. In the above-mentioned fuel assemblies with a substantially square cross-section, it has been found to be advantageous to separate the sub-bundles of the symmetrically arranged fuel rods by means of a cruciform support member connected at intervals to the wall of the fuel channel. In addition to improved reactive effects, when the channel-formed support member is filled with moderator water, this also provides an improved design from a strength point of view. Since the channel-formed support member is connected to the walls of the fuel channel, a light and sturdy design is obtained which is simple to manufacture.

SUMMARY OF THE INVENTION

In order to allow more non-boiling water into the central parts of a nuclear fuel assembly, each sub-bundle of fuel rods in the fuel assembly is provided with a cross-section having a reduced corner portion facing towards the center of the fuel assembly. This allows a central channel of enlarged cross-section to be provided due to the reduced corner portions of the sub-bundles.

In relation to prior art arrangements of nuclear fuel assemblies in sub-bundles of fuel rods, the invention, with its enlarged central passage provides several considerably advantages. By enlarging the central passage provided by the channel-formed support member, more non-boiling water may be contained within the central part of the fuel assembly, which results in improved neutron moderation in this area and in the fuel being utilized in a better way despite the removal of at least one fuel rod from each sub-bundle. In addition to its moderator function, the larger amount of water also has an absorbing function which, at a lower temperature than the operating temperature, becomes predominant owing to the higher density of the water in this temperature region. The shut-off margin is improved in the case of a cold reactor because the larger amount of water, contained within the central channel of the fuel assembly, reduces the reactivity.

In a sub-bundle, fuel rods with different degrees of enrichment may be asymmetrically arranged. Because the sub-bundles have a cross-section with a reduced corner portion, incorrect insertion of a sub-bundle is no longer possible.

BRIEF DESCRIPTION OF THE DRAWINGS

The invention will now be further described, by way of example, with reference to the accompanying drawings, in which.

DESCRIPTION OF PREFERRED EMBODIMENT

Figure 1:
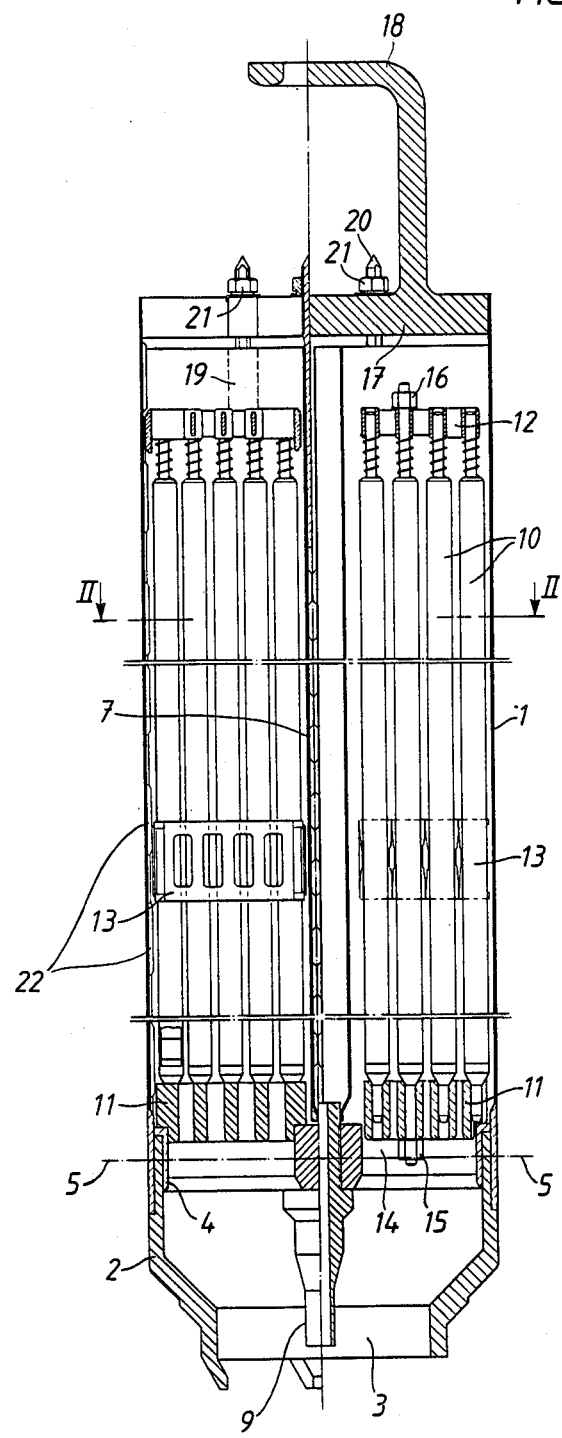
FIG. 1 shows an embodiment of a fuel assembly according to the invention in a vertical section taken on the line I—I in FIG. 2.

In FIGS. 1–4, 1 designates a fuel channel of substantially square cross-section. The lower end of the fuel channel 1 surrounds, with no mentionable play, an upper square portion of a bottom part 2 with a circular, downwardly extending inlet opening 3 for liquid coolant (e.g. moderator water). The bottom part 2 supports a base plate 4 in addition to the fuel channel 1. The lower end of the fuel channel 1 has a relatively thick wall portion, which may be fixed to the bottom part 2 and the supporting plate 4 by means of several horizontal bolts, indicated by dash-dotted lines 5. The fuel channel 1 is divided into four vertical parts 6 (see FIG. 2) by means of a hollow, channel-forming support member 7, having a cruciform cross-section and being fixedly connected at intervals to each of the four walls of the fuel channel 1. The channel-forming support member consists of four hollow wing channels 8 and a hollow, generally square cross-section central channel 7a. The channel-forming member 7 is connected at its lower end to an inlet tube 9 for moderator water.

The four vertical parts 6 of the fuel channel 1 each contains a sub-bundle of twenty four fuel rods 10. In each sub-bundle, the rods 10 are arranged in a symmetrical lattice with five rows, four of which contain five rods, but the fifth of which has only four rods so that each sub-bundle has a chamfered corner portion. Expressed in another way, each sub-bundle comprises a square lattice of uniformly distributed fuel rods from which one rod has been removed at one corner. Each sub-bundle extends upwardly from a grid-like bottom tie plate 11, downwardly from a grid-like top tie plate 12 and has a plurality of rod-locating spacers 13 disposed between the tie plates. The fuel channel 1, the channel-forming member 7, and the spacers 13 may be made of a zirconium alloy such as "Zircaloy 4". The four bottom tie plates 11 are supported by the base plate 4 and are each partially inserted into a respective square hole 14 formed therein. In each sub-bundle at least one of the fuel rods 10 is formed with relative long, threaded end plugs, the lower end plug being passed through the bottom tie plate 11 and clamped thereto by a nut 15, the upper end plug being passed through the top tie plate 12 and being clamped thereto by nut 16.

The upper end portion of the fuel channel 1 surrounds a lifting plate 17, which partially makes contact with the inner wall surface of the fuel channel 1. A lifting handle 18 is connected to the lifting plate 17 and forms together with the plate a solid cast steel lifting member. The lifting plate 17 is fixed to the channel-formed support member 7, for example by inserting vertical bars 19 into respective wing channel parts 8 of the support member and fixing them thereto. At its top, each bar 19 has a vertical, screw-threaded portion 20, which is passed, with clearance, through a corresponding hole in the central portion of the lifting plate 17 and provided with a nut 21. As will be clear from FIG. 1, the fuel channel 1 may be provided with indentations, intermittently arranged in the longitudinal direction of the fuel channel 1, to which the channel-formed support member 7 is fixedly connected.

Figure 2:
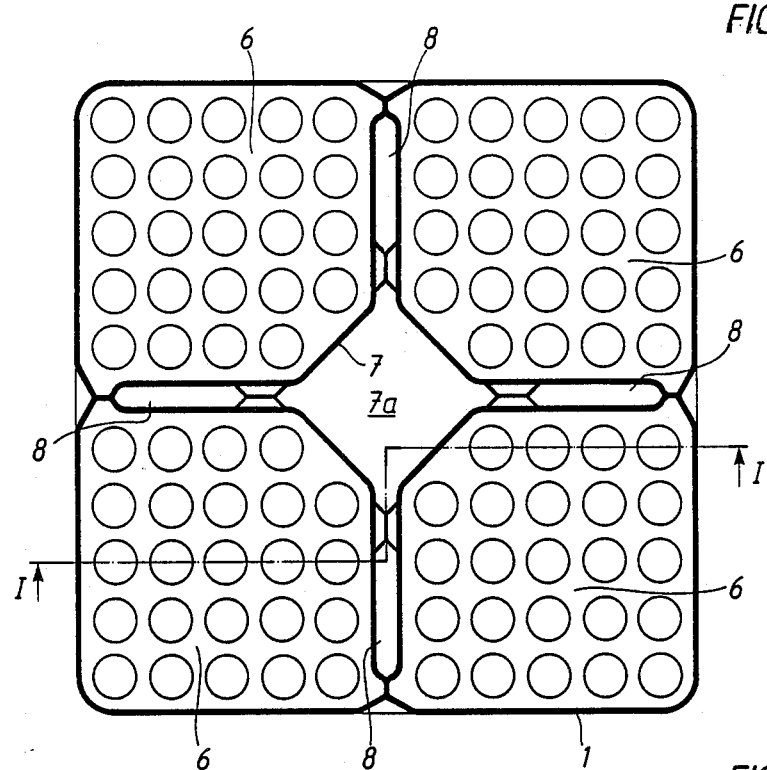
FIG. 2 shows the fuel assembly of FIG. 1 in a view perpendicular to a horizontal plane through the line II—II in FIG. 1.
Figure 3:
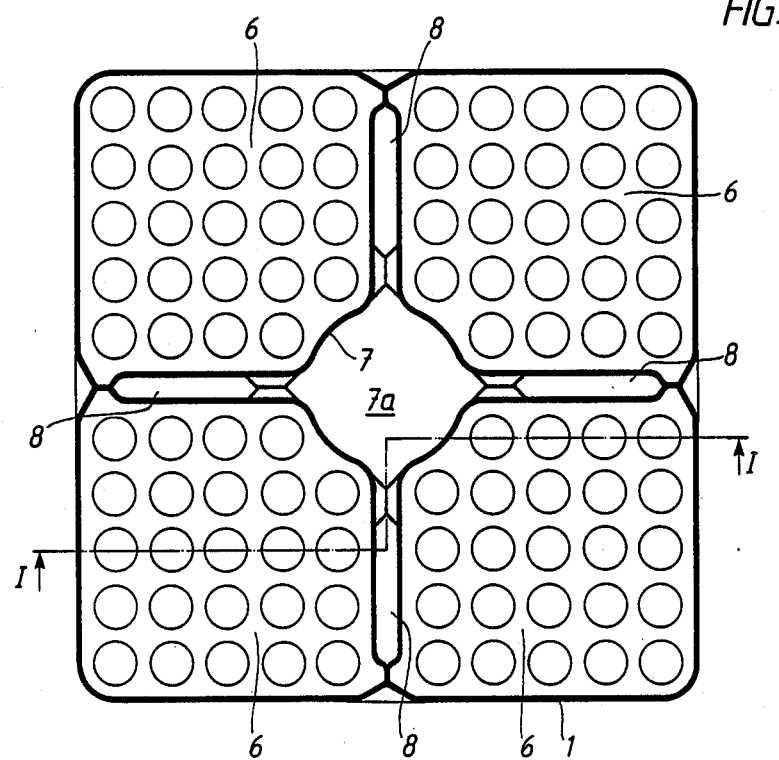
FIG. 3 shows an alternative embodiment of the same fuel assembly as shown in FIG. 1 also in a view perpendicular to a horizontal plane through the line II—II in FIG. 1.

In FIGS. 2 and 3 the fuel assembly is shown in cross-section (i.e. a view perpendicular to the horizontal plane through the line I—I in FIG. 1). These Figures show how the channel-formed support member 7 is provided with an enlarged generally square-section central channel 7a. Each vertically extending channel-forming wing part in the support member 7 is connected at intervals, along its outer end, to the fuel channel 1 and at vertically spaced intervals communicates with the central channel 7a, the shaping of the channel 7a conforming to the reduced corner portion of each fuel rod bundle. The vertically-extending central channel 7a which communicates with the inner ends of the channel-forming wings, i.e. the enlarged cruciform centre, may be formed as shown in FIG. 2 (with substantially square cross-section and with the corners of the square directed towards the wing parts), or as in FIG. 3 (with a substantially circular cross-section). Alternatively, in the case of a square cross-section central channel 7a, the sides of the square may be directed towards the wing parts.

Figure 4:
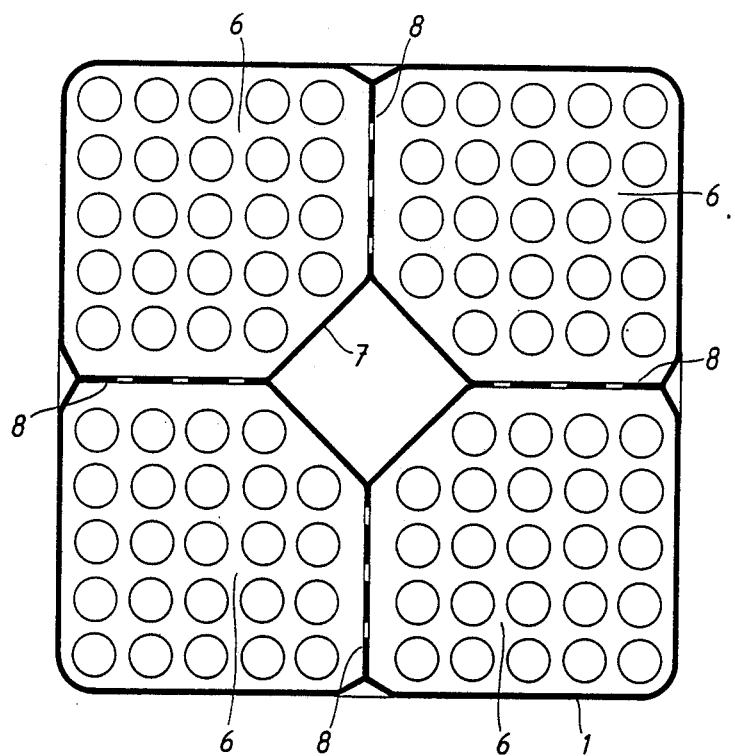
FIG. 4 shows a section of an alternative embodiment of a fuel assembly in accordance with the invention.

FIG. 4 shows an alternative embodiment of a fuel assembly in a view perpendicular to the horizontal plane. The wing parts 8 which extend towards the enlarged central channel 7a are formed as thin plates with through-holes for horizontal water passage only between the adjacent sub-bundles 6. The thin sheet metal plates, making up the wing parts 8 are fixedly connected to the fuel channel wall and the enlarged central channel, may be made sufficiently strong to absorb the tensile forces arising due to the overpressure in the fuel assembly. With the design of FIG. 4, material is saved (which renders the manufacture less expensive), without any weakening of the structure.

Figure 5:
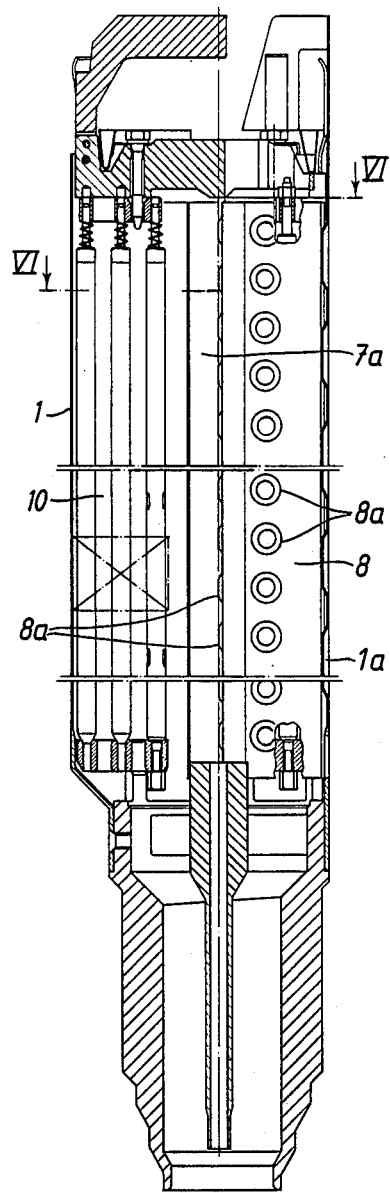
FIG. 5 shows an embodiment of a different type of a fuel assembly according to the invention in a vertical section through the line V—V in FIG. 6.
Figure 6:
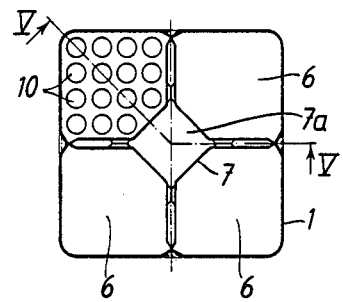
FIG. 6 shows the fuel assembly of FIG. 5 in a view perpendicular to a horizontal plane through the line VI—VI in FIG. 5.

FIGS. 5 and 6 show an embodiment of a similar type of fuel assembly, in which the fuel channel 1 surrounds four sub-bundles and in which each sub-bundle consists of fifteen fuel rods 10. The rods 10 are arranged in a symmetrical lattice with four rows in each sub-bundle, three of four rods each and the fourth of three rods. By forming each sub-bundle with a reduced corer portion such that, from a square lattice of fuel rods 10, one rod has been removed from one corner, the channel-formed support member may be provided with an enlarged central channel in the same way as in the embodiment according to FIG. 1.

Figure 7:
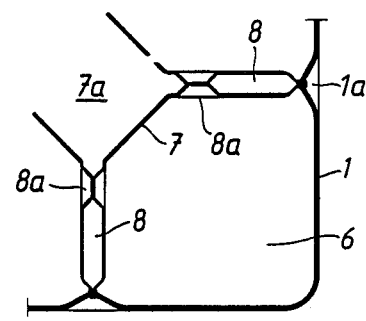
FIGS. 7 and 8 show in detail how the channel-formed supporting member is designed and connected to the fuel channel wall.
Figure 8:
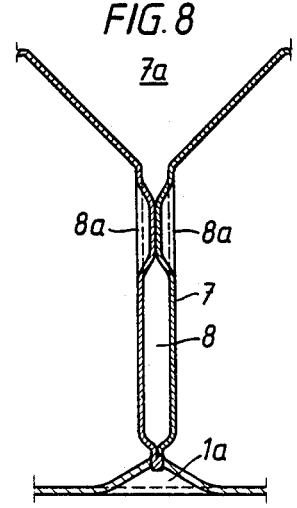

FIGS. 7 and 8 show, in horizontal section and in greater detail, examples of how the channel-formed support member 7 may be formed, each wing part defining the channels 8 being intermittently fixedly connected to indentations 1a in the wall of the fuel channel 1. Towards the center, prior to the widening of the channels 8 into the central channel 7a, the side walls defining the channels 8 are provided with indentations 8a which are joined together intermittently along the entire channel-formed support member 7. The surrounding fuel channel 1 with its longitudinal indentations 1a, together with the enclosed channel-formed support member 7 fixedly connected to the fuel channel 1, forms a coherent unit which provides a very strong structure.

Instead of forming indentations 8a in the sheet-metal forming the sides of the wing channels 8 to keep the sides of the wing parts apart, spacers can be connected to the sides of the wing parts to achieve the same purpose.

Figure 9:
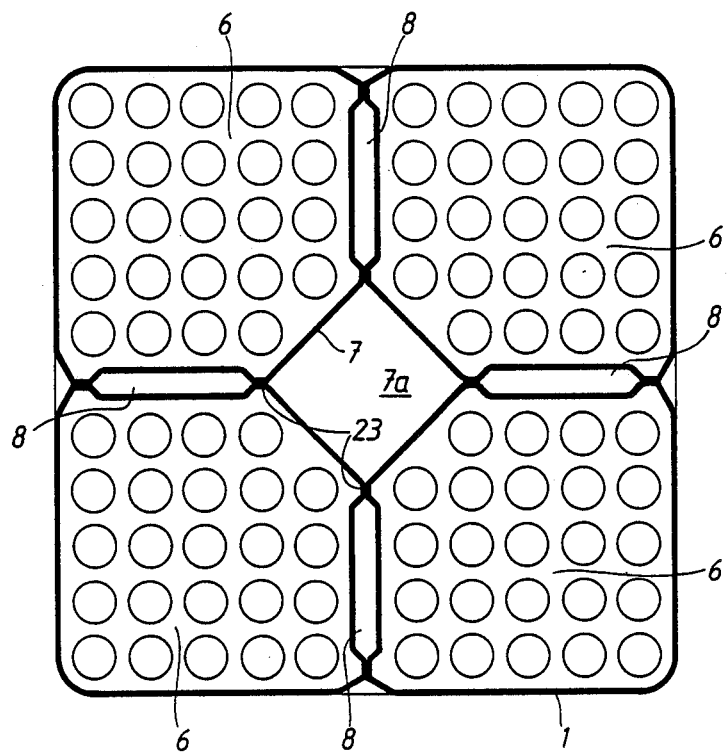
FIG. 9 shows in section a still further embodiment of fuel assembly according to the invention.

In the manufacture of the channel-formed support member of the fuel assembly, the indentations 8a located opposite to each other in the wing parts are joined together, for example by means of spot welding. Unless the material fulfils high demands for conformability, there is a risk of cracks forming in the manufacture of the support member 7. Because of pressure differences occurring, high local stresses will arise during operation, and under extreme conditions these high local stresses may lead to the occurrence of endurance cracks in the support member. By replacing the indentations by longitudinal folds 23, as shown in FIG. 9, the demands made on the material are reduced and the forming of the parts and the joining thereof into the channel-formed support member 7 can be simplified. The joining together along the longitudinal folds 23 may be made by spot welding to a sufficient extent with respect to strength but without any requirement for accuracy in the axial positioning of the weld points. With the longitudinal folds 23 in the channel-formed support member 7, the risk of crack formation during manufacture and the local high stresses during operation are reduced. The welding of the connection of the longitudinal folds 23 may possibly be performed at the same time as the continuous cross edge welding to the fuel channel. In a channel-formed support member with a cruciform cross-section with interconnected longitudinal folds, the water must be supplied separately to each of the five different vertically extending channels.

What is claimed is:

1. A nuclear fuel assembly for a nuclear reactor of the boiling reactor type comprising a fuel channel of substantially square cross-section, a plurality of vertical fuel rods arranged in sub-bundles of substantially square cross-section, a vertical channel-formed support member of cruciform cross section with a central channel for the passage of liquid coolant through the fuel assembly, said sub-bundles of fuel rods being surrounded by said fuel channel and spaced apart by wing parts of said channel-formed support member fixedly connected to each side of said fuel channel, the central channel of said support member being limited by the channel-formed support member, which conforms to the corner portions of said sub-bundles, in the region between the corner portions of the sub-bundles directed towards the centre, characterised in that the cross-centre of the channel-formed support has been enlarged for increased water through-flow by moving apart the walls of the centre of the cross by a distance corresponding to at least one fuel rod diameter in each quadrant from the intersectional line between adjacent outer limits of the wings of the cross, and that in each sub-bundle of fuel rods in the fuel assembly, at least one fuel rod is missing from the corner portions of the sub-bundles directed towards the centre of the fuel assembly.

2. A nuclear fuel assembly according to claim 1, in which the enlarged central channel of the channel-formed support member has a substantially square cross-section.

3. A nuclear fuel assembly according to claim 1, in which the enlarged central channel of the channel-formed support member has a substantially circular cross-section.

4. A nuclear fuel assembly according to claim 1, in which the wing parts of the channel-formed support member are fixedly connected to the fuel channel and define channels for vertical passage of liquid coolant, which channels provided by the wing parts are in communication with the central channel in the fuel assembly.

5. A nuclear fuel assembly according to claim 1, in which the wing parts of the channel-formed support member are fixedly connected at intervals to the fuel channel wall and consist of thin sheet metal plates having horizontal holes for the passage of liquid coolant between adjacent spaces for the sub-bundles in the fuel assembly.

6. A nuclear fuel assembly according to claim 4, in which the wing parts of the channel formed support member, prior to their widening into the central channel, are connected to each other by means of spaced-apart indentations formed therein.

7. A nuclear fuel assembly according to claim 4, in which the wing parts of the channel-formed support member, prior to their widening into the central channel, are connected to each other by longitudinal folds to provide five separated vertical channels for flow of liquid coolant between the sub-bundles of the fuel assembly.

8. A nuclear fuel assembly according to claim 1, in which the wing parts of the channel-formed support member are fixedly connected at intervals to the fuel channel and define four wing channels extending from end to end of the fuel assembly, which wing channels are not in communication with the central channel defined by the channel-formed support member apart from at each end thereof.

9. A nuclear fuel assembly for use in a boiling reactor-type nuclear reactor, said nuclear fuel assembly comprising:

an elongated fuel channel which includes four side walls that provide said elongated fuel channel with an essentially square cross section, said elongated fuel channel defining an imaginary axis line therethrough, an elongated generally cruciform-shaped support member located within said elongated fuel channel, said support member including center walls providing an elongated central channel for the passage of liquid coolant therethrough and wing walls providing four wings which are individually connected to said respective four side walls of said fuel channel, thus dividing said fuel channel into four separated portions, and four sub-bundles of fuel rods respectively positioned in said four portions of said fuel channel, each of said sub-bundles comprising a generally rectangular lattice of separate fuel rods within an imaginary rectangle, each sub-bundle having a single fuel rod in each lattice nearest said imaginary axis line of said fuel channel omitted, and wherein said center walls of said support member provide said central channel with an essentially rectangular cross section and respectively extend into the imaginary rectangle formed by the adjacent lattice of fuel rods in an area where the single fuel rod therein has been omitted.

10. A nuclear fuel assembly for use in a boiling reactor-type nuclear reactor, said nuclear fuel assembly comprising:

an elongated fuel channel which includes four side walls that provide said elongated fuel channel with an essentially square cross section, said elongated fuel channel defining an imaginary axis line therethrough, an elongated generally cruciform-shaped support member located within said elongated fuel channel, said support member including center walls providing an elongated central channel for the passage of liquid coolant therethrough and wing walls providing four wings which are individually connected to said respective four side walls of said fuel channel, thus dividing said fuel channel into four separated portions, and four sub-bundles of fuel rods respectively positioned in said four portions of said fuel channel, each of said sub-bundles comprising a generally rectangular lattice of separate fuel rods within an imaginary rectangle, each sub-bundle having a single fuel rod in each lattice nearest said imaginary axis line of said fuel channel omitted, and wherein said center walls of said support member provide said central channel with an essentially circular cross section and respectively extend into the imaginary rectangle formed by the adjacent lattice of fuel rods in an area where the single fuel rod therein has been omitted.

* * * * *